United States Patent [19]

Armistead

[11] Patent Number: 5,303,691

[45] Date of Patent: Apr. 19, 1994

[54] PORTABLE MINIATURE CAMP STOVE

[76] Inventor: James H. Armistead, P.O. Box 2571, Sacramento, Calif. 95812

[21] Appl. No.: 941,782

[22] Filed: Sep. 8, 1992

[51] Int. Cl.⁵ ............................................. F24C 1/16
[52] U.S. Cl. ................................. 126/9 R; 126/25 A; 126/43
[58] Field of Search ............... 126/9 R, 262, 43, 1 R, 126/9 B, 25 R, 25 A

[56] References Cited

U.S. PATENT DOCUMENTS

| | | | |
|---|---|---|---|
| 936,482 | 10/1909 | Seeley | 126/9 R |
| 1,604,727 | 10/1926 | Volke | 126/9 R |
| 2,386,501 | 10/1945 | Pearson | 126/9 R |
| 2,604,089 | 7/1952 | Peyser | 126/262 |
| 3,552,379 | 1/1971 | Clarke | 126/262 |
| 3,566,857 | 3/1971 | Price | 126/262 |
| 4,834,065 | 5/1989 | McQuade | 126/262 |
| 4,905,659 | 3/1990 | Armistead | 126/9 R |
| 5,048,506 | 9/1991 | Hayashi | 126/262 |
| 5,148,688 | 9/1992 | Pimm et al. | 126/262 X |

Primary Examiner—Larry Jones

[57] ABSTRACT

A low profile portable wind resistant Camp Stove that is small enough, pint size, to fit inside a small SIERRA MUG mess kit, for use with HEXAMINE, a solid chemical fuel. Variations are provided for altitude adjustment and two or more heat ranges.

6 Claims, 1 Drawing Sheet

PORTABLE MINIATURE CAMP STOVE

BACKGROUND OF THE INVENTION

This invention is an improvement of U.S. Pat. No. 4,905,659 in that it is related to light weight, wind resistant, portable stoves for camping and general outdoor applications that use solid Hexamine fuel tablets as the primary source of fuel.

Before now, it was believed that the smallest practical size for an efficient wind resistant Hexamine stove was about 4" d. by 4" h. in order to accommodate a normal Sierra Cup or Sierra Mug and allow efficient combustion of one Hexamine Tablet.

NEW DISCOVERY

However, after numerous experiments, it has been found that Hexamine Fuel, which melts at about 280° F., can be burned as efficient in a pint size wind resistant combustion chamber, if the burner assembly is designed or provided with good heat sinking, heat absorbing, or cooling.

HEAT SINKING OR ABSORBING

Heat sinking is herein defined as any method that will help prevent the burner platform from over-heating and causing the fuel to melt without burning or to burn too fast.

PREVIOUS DESIGNS

In previous Hexamine stoves by other inventors, it was common to place the fuel on the bottom of the stove without any other burner or platform.

This was found less efficient since the burning surface obtains temperatures greater than the melting point of the fuel, which alters the heat curve, and melted fuel escapes the burning process or burns to fast.

U.S. Pat. No. 4,905,659 (owned by applicant) uses a pedestal which helps keep the burner cool with incoming air and absorbs some heat, but this is not always successful in a low profile Hexamine Stove with a shorter pedestal. Heat build-up need only be delayed a few minutes since high heat is only generated during the first 6 minutes.

PREVIOUS PROBLEMS

For example, if a stove approximately 2 inches high is used and the tablet is placed directly on the bottom of the cylinder, the surrounding area will overheat and much of the Hexamine melts without burning or flares up; thus, the total burn time or BTU output of the tablet is reduced.

With the U.S. Army Canteen Cup Stove (1941 Pearson U.S. Pat. No. 2,386,501), which was designed for "Sterno" cans but used with Hexamine, melted fuel would soak into the soil and reduce efficiency. Plus, fuel consumption was variable and unpredictable.

After the above discoveries, it has possible to design a higher efficient low profile Hexamine stove small enough to carry or "nest" inside a small mess kit (or Sierra Mug) and with a "Sierra Stove" heat curve.

HEAT ABSORBING

The best heat sinks appear to be a ceramic magnet or metallic mass which help keep the burning surface below the melting point. Sand or ceramic added inside the burner cup also change the melting process.

Liquid coolants piped around the burner surface, if not neglected by operators, could be used on larger Hexamine stoves or furnaces.

Since U.S. Pat. No. 4,905,659, it has also been determined that a distance of 1⅜" from the burner to the cooking vessel provides the best transfer of heat from sea level to 7000 feet (without adjustment) using only one 5 gram Hexamine fuel tablet.

A very efficient HIGH HEAT 10 minute 1 tablet burn cycle is possible with proper heat sinking in a very compact stove, but upward adjustment is still helpful above 7000 feet altitude.

Two heat ranges work best. One for boiling water or frying and one for warming food ready-to-eat.

HEXAMINE VS. TRIOXANE FUEL

Hexamethalene-tetramine

In 1986, the U.S. Army stopped using Hexamine fuel since they believed that Hexamine combustion could emit unsafe levels of Hydrogen Cyanide gas (HCN) in small 2-man tents.

Since it is possible that improper combustion of any fuel may cause exhaust problems, it is also possible a better burner could prevent harmful exhaust problems. But, it is doubtful the U.S. Army will admit Mega-errors, mistakes, or test new stoves. Missile testing is more important.

The U.S. Army used Hexamine for over 30 years with the Canteen Cup Stoves, after first suspecting HCN exhaust problems, and consumed about six tablets (30 grams) per application, (6 times as much as a Sierra Stove) which may have multiplied any real or suspected HCN gas problems. Trying to warm hands in sub-zero weather with Hexamine in tents, may have been a problem in Korea.

The U.S. Army may have been uncertain of their suspicions, since their Surgeon General found no reason to warn the average consumer of the suspected dangers, and all stockpiled fuel was sold to any buyer. Hexamine was found too dangerous to be used by the Army, but was not too dangerous to be sold to Boy Scouts, etc.

Hexamine is still used by the British, Australian, and Swiss Armies and is popular in Europe with back packers.

Hexamine, an anti-biotic, has medical applications, which means small amounts may be tolerated, if swallowed. Conversely, Trioxane should be washed off hands before meals which is difficult in military or outdoor cooking situations.

Hexamine has a much higher BTU rating and is less expensive than Trioxane.

After Operation Desert Storm in 1990, the U.S. Army decided to discontinue Trioxane usage, since open Trioxane is hazardous at desert temperatures due to a 113° F. flash point (another Mega-error). But, Hexamine ignites above 400° F., which is safer in automobile trunks or desert zones.

Both Hexamine and Trioxane fumes contain Formaldehyde Gas, but the amount may be related to the melting process or the burner temperature.

More Formaldahyde Gas may be produced by Trioxane singe it melts at a lower temperature, 150° F., and more may escape combustion. Since, Formaldehyde Gas is flammable, the stronger the odor, the more has escaped combustion.

[Reference: DANGEROUS PROPERTIES OF INDUSTRIAL MATERIALS, Sax & Lewis, 7th Edition, Von Nostrand Reinhold.]

Conclusion

Since an unconfirmed old ARMY memo indicates Hexamine fumes may emit HCN or may cause death in tents, this inventor believes the suspected exhaust problems should be verified and published, if true.

History and most usage indicates that Hexamine is better, safer, and cheaper than Trioxane for outdoor cooking.

SUMMARY OF THE INVENTION

HEXAMINE BURNER DESIGN

A Hexamine burner should have a slight (1/16") lip to prevent the tablet from sliding off the burner, like butter slides on a hot skillet. The remainder of the burner cup should contain a thick ceramic magnet, or sand, or other heat sinking material. The higher the lip, the slower the tablet burns. Thus, by removing the heat sink, where the heat sink has been added inside the burner cup, two heat settings are possible with the same burner cup, since the depth of the burner cup will also change. Or, by adding a deeper burner cup on top of a burner cup with a magnetic heat sink, two or more heat ranges may be provided with the same stove. A deeper burner cup burns slower, longer and cooler by choking the air supply. (See U.S. Pat. No. 4,905,659) (see Drawings).

HEXAMINE STOVE DESIGN

The stove design may take several shapes as long as an air gap is provided for exhaust gases near the top and air intake holes are provided near the base. Wind resistance is important since Hexamine has a high ignition temperature, and gusts of wind will lower the temperature and extinguish the flame.

A tin can was selected for U.S. Pat. No. 4,905,659, since it has evolved over several generations as a light weight, mass producible cylinder, and the "hot spot" near the burner base is elevated and safe on paper.

A low profile 2" high by 4" diameter tapered or bell shape stove is possible as long as the base has sufficient space for air intake holes, and good heat sinking is provided. The gauge or thickness of the stove material helps to sink heat. A grill is arbitrary, since air gaps may be provided by dents, spacers, or impressions in the stove body or the cooking vessels.

A design with a flare top causes less residual heat accumulation than a cylinder with vertical walls since the shape of a Sierra Mug is tapered. Residual heat causes the burner to overheat, which causes fuel to melt prematurely which reduces efficiency.

Figure 1:
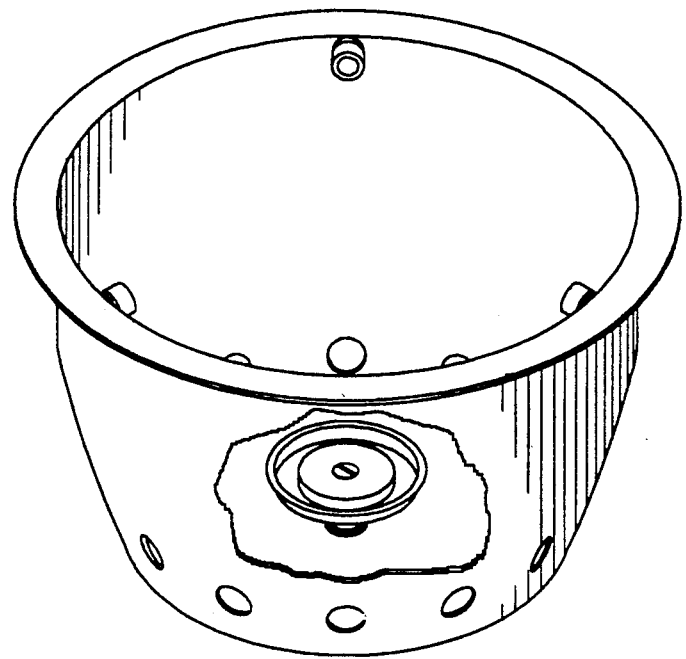
FIG. 1 is a cut away view of the stove of the present invention.
Figure 2:
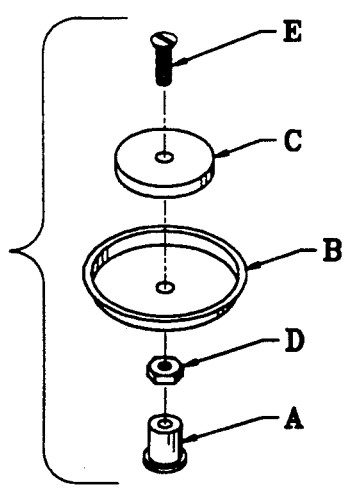
FIG. 2 is a plan view of the non-magnetic embodiment of the burner assembly.
Figure 3:
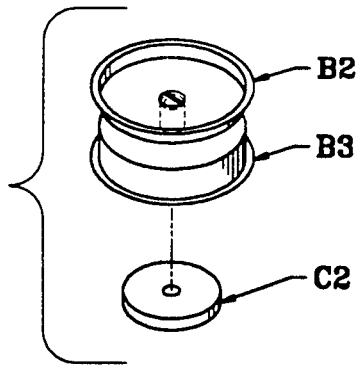
FIG. 3 is a plan view of the magnetic burner assembly.

The "hot spot" under the stove should be concave to prevent accidental scorching or damage to outdoor tables.

DESCRIPTION OF THE PREFERRED EMBODIMENTS

PREFERRED EMBODIMENT USING A SIERRA MUG COOKING POT

The deeper the cooking pot recesses into the stove, the more heat is captured by the cooking surface before heat escapes into the atmosphere. (Ref: U.S. Pat. No. 4,905,659) Therefore, for HEXAMINE STOVES using one 5 gram tablet, the optimum shape may be approximately 3.75" diameter at the top, 2.75" deep, and 3" diameter at the base, with the required heat sinking burner-fuel holder. Altitude adjustment and variable heat burners are optional. The upper air gap should be about 3/16" wide around the rim. The minimum air intake should be about 12 holes×¼ in diameter, or equivalent. The maximum distance from the burner to the cooking pot should be about 1.625".

PREFERRED BURNER ASSEMBLY

An adjustable burner assembly may be secured to a threaded pop-rivet post(A) (⅜" long) which is press fitted (or welded) to the base of the stove. The adjustable burner assembly may consist of a Harvel 1¼" inner seal size bottle cap(B), a screw(E) (¼" long) through burner, a securing nut(D) under burner, and a round ceramic magnet(C) (¼" thick by ⅞" in diameter with a 9/32" center hole) positioned inside the burner as a heat sink and as a magnetic clamp for a second burner.

BURN TIME: 10 minutes. HIGH HEAT

The second burner may be normal bottle-cap size and, optionally, attached to the burner post with a small chain to prevent loss and easy attachment to the main burner. BURN TIME: 15 minutes. MEDIUM HEAT Drawing also shows a reversible burner (B2 & B3), where B3 is deeper, burns slower, and provides a lower heat range, and where Magnet (C2) secures the sub-assembly to a magnetic stove base and acts as a heat sink. Solid contact with the magnet provides the best heat transfer. A stove weighing only 2.6 ozs. is possible to type 420 Stainless Steel.

TRIOXANE requires a different stove because it burns faster and requires many more air intake holes and larger exhaust outlet. Heat control may only be possible with different size fuel tablets, which is not feasible.

PREFERRED MATERIAL

Stainless Steel sells best. Type 420 stainless is magnetic. Type 302 (18-8) stainless is non-magnetic. Aluminum may save ¼ oz. Stainless models weigh about 4 ozs.

HEAT CURVES VS. EFFICIENCY

Experiments prove that the fastest release of energy from a solid chemical fuel is not always the most efficient; therefore, the burner should be chosen to match the application.

For instance, a 5 gram Hexamine tablet burned in less than 4 minutes will release enough heat to create a red spot on the bottom of a Sierra Cup, and permanently discolor the stainless steel, but will not boil the water.

The reason for this is because much heat escapes without being conducted into the water. Transfer time is slow.

Therefore, the tedious process of finding the best heat curve for the release of energy to boil water from sea level to 6000 feet altitude took many trial and error experiments.

It is very possible to boil 8 ozs. of water on one tablet at sea level in less than 5 minutes, but the total burn time or sustained boiling time wound be reduced, substantially.

Therefore, the heat curves should be selected for the best general cooking applications, since adjustments are difficult to learn or to remember unless used every day.

The 10 minute heat curve for HIGH HEAT has many applications, and time to warm other items after boiling water.

The 15 minute heat curve for MEDIUM HEAT has many applications for cooking rice, omlets, stews, M.R.E.'s, vegetables, etc.

SPECIFICATIONS

The above configured portable camp stoves should boil 8 ozs. of 50° F. water in 6 minutes on one 5 gram HEXAMINE fuel tablet. Maximum altitude is unknown, but above 8000 feet with a minor adjustment.

I claim:

1. A portable, wind resistant, solid chemical burning camp stove apparatus comprising:
   a. a cup shaped container fabricated from a heat resistant material;
   b. said container having a closed bottom end and an open top end;
   c. said container having a plurality of spacers secured to said top end which will support a cooking pot while providing an air gap between said top end and said cooking pot;
   d. said container having a plurality of air intake holes above said bottom end;
   e. said container having a sub-assembly burner secured inside said container;
   f. said sub-assembly burner comprising a bottle cap like fuel holder,
      a supporting member, and securing means, so that said sub-assembly may be secured on the inside of said container;
      wherein, the improvement comprises a heat sinking means to cool said sub-assembly burner,
      whereby; a high efficient, almost pint size stove may be constructed.

2. A camp stove according to claim 1 further including an adjustment means secured to said sub-assembly burner for variations in altitude.

3. A camp stove according to claim 1 wherein, said heat sinking means includes a magnet inserted inside said fuel holder.

4. A camp stove according to claim 1 further including
   a second burner to vary the heat range;
   wherein, said second burner is supported by said sub-assembly.

5. A camp stove according to claim 1 wherein, said heat sinking means includes sand inserted inside said fuel holder.

6. A camp stove according to claim 1 wherein, said heat sinking means includes metal inserted inside said fuel holder.

* * * * *

UNITED STATES PATENT AND TRADEMARK OFFICE
CERTIFICATE OF CORRECTION

PATENT NO. : 5,303,691

DATED : April 19, 1994

INVENTOR(S) : James H. Armistead

It is certified that error appears in the above-indentified patent and that said Letters Patent is hereby corrected as shown below:

On the title page, item [76] Inventor: change "P.O. Box 2571, Sacramento, Ca. 95812" to --2727 Capitol Ave. Sacramento, CA 95816".

Column 1, line 59, change "has" to "was".
Column 2, line 65, change "singe" to "since".
Column 4, line 17, change "½" to " ½" ".
Column 5, line 6, change "would" to "would".

Signed and Sealed this

Twentieth Day of September, 1994

Attest:

BRUCE LEHMAN

Attesting Officer     Commissioner of Patents and Trademarks